J. E. OSMER.
FLUSHING APPARATUS.
APPLICATION FILED DEC. 23, 1915.
1,229,505.
Patented June 12, 1917.
2 SHEETS—SHEET 2.
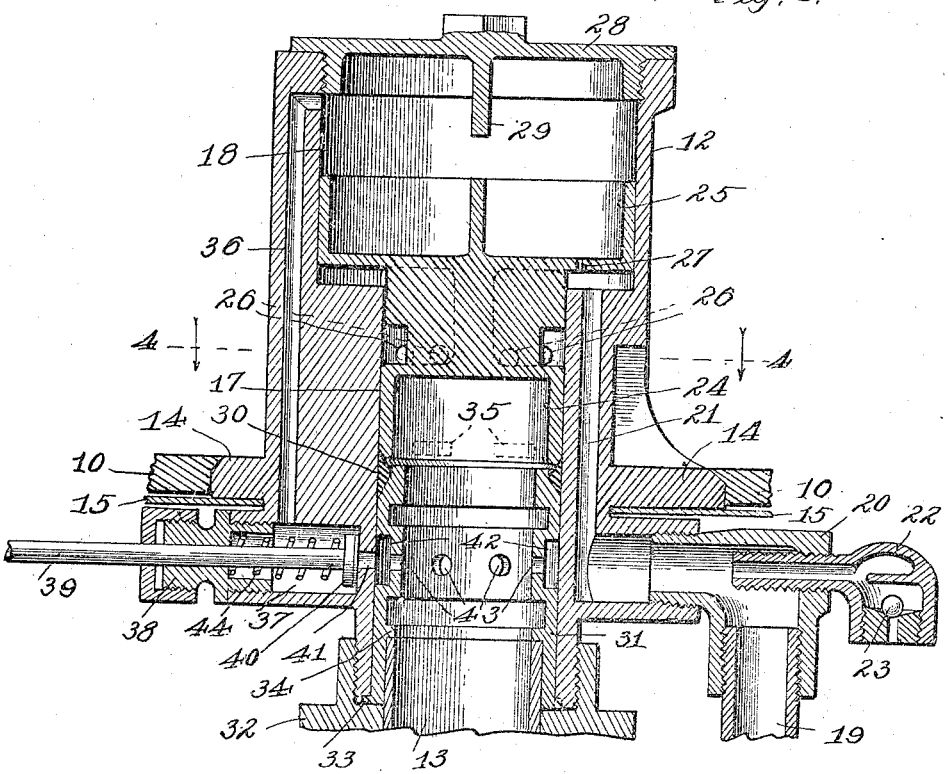
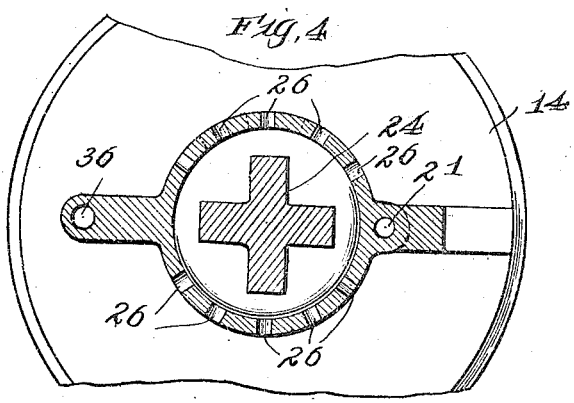
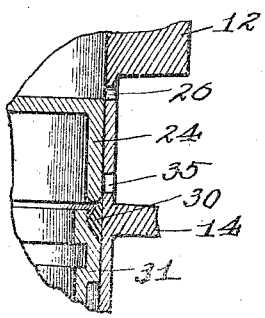
Witnesses:
G. A. Taubenschmidt.
E. Paul Carter.
Inventor
John E. Osmer.
By Miller & Chindahl
Attys

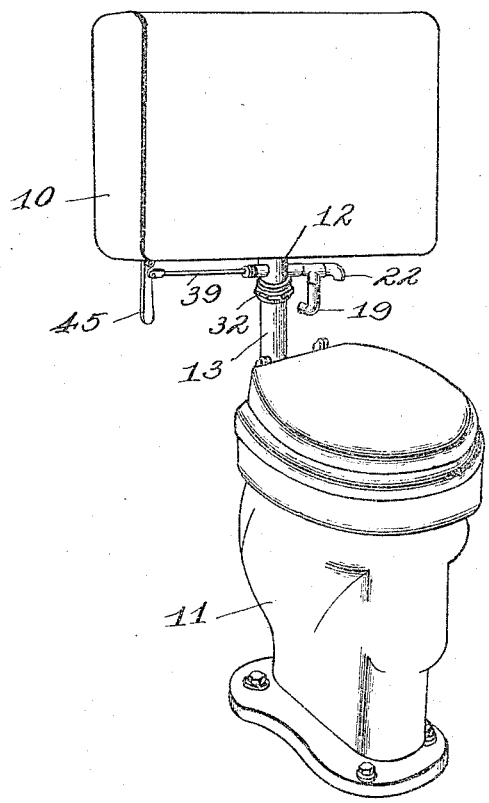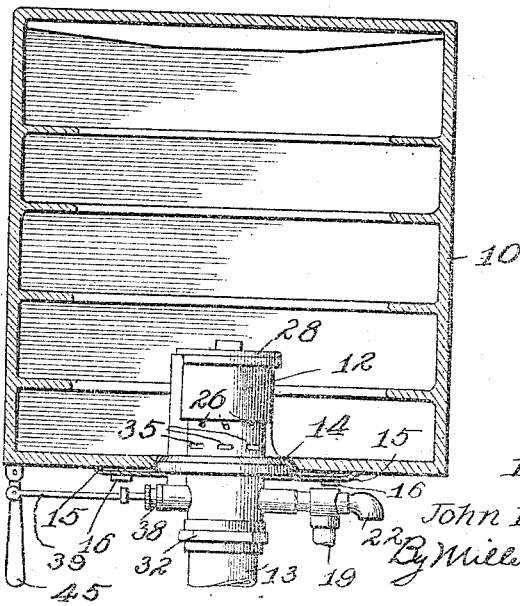

UNITED STATES PATENT OFFICE.

JOHN E. OSMER, OF OWOSSO, MICHIGAN.

FLUSHING APPARATUS.

1,229,505.            Specification of Letters Patent.       Patented June 12, 1917.

Application filed December 23, 1915. Serial No. 68,308.

*To all whom it may concern:*

Be it known that I, JOHN E. OSMER, a citizen of the United States, residing at Owosso, in the county of Shiawassee and State of Michigan, have invented certain new and useful Improvements in Flushing Apparatus, of which the following is a specification.

This invention contemplates a novel and improved apparatus for flushing closet bowls.

One of the objects of the invention is to produce an improved apparatus which is simple and reliable in operation and which entirely eliminates the use of float valves and other devices so apt to get out of order.

Another object is to provide an improved apparatus arranged to maintain in the tank a supply of water under the pressure of compressed air.

A further object is to produce an improved valve device for controlling the discharge of water from the tank to the bowl and the recharging of the tank with water and air.

Further objects and advantages, some of which relate to details of construction, will be apparent from the following description.

In the accompanying drawings, Figure 1 is a perspective view of an apparatus embodying the features of my invention. Fig. 2 is a view showing the tank in vertical section and the controlling valve in elevation. Fig. 3 is an enlarged vertical section through the controlling valve. Fig. 4 is a horizontal section in the plane of line 4—4 of Fig. 3. Fig. 5 is a vertical sectional detail of a portion of the valve structure.

Referring to Fig. 1, 10 indicates the tank, 11 the bowl, 12 the controlling valve, and 13 a conduit connecting said valve with the bowl 11.

The valve 12 is preferably mounted in the bottom wall of the tank, being supported therein by suitable means, as, for example, a circular flange 14 on the body of the valve fitting into a corresponding opening in the bottom wall of the tank, said flange and opening preferably having beveled edges; and securing means which may comprise clips 15 overlying the flange 14, and bolts 16 for drawing said clips toward the tank wall to maintain the flange 14 tightly seated in its opening.

The body of the valve 12 is interiorly chambered, being provided with a bore 17 in its lower portion and an enlarged bore 18 in its upper portion forming water-receiving chambers. The valve is connected to a suitable supply of water under pressure, as, for example, a city main, by means of a supply pipe 19. In the present instance, the pipe 19 is connected to the valve by a coupling 20 which is tapped into the lower end of an inlet passage 21 leading upwardly and communicating at its inner end with the interior of the valve. A valved air-inlet device 22 is mounted, in the present instance, on the coupling 20 and is provided with an inwardly-opening valve 23 of suitable construction which permits air to be drawn into the main valve 12 by the inward flow of the water.

A differential piston 24, 25, comprising two piston-heads rigidly connected together, is slidably mounted in the respective bores 17, 18, of the valve, the upper piston-head being located above the inner end of the water supply passage 21 and the lower piston-head being located below such inner end, so that the water supply will be delivered into the space between the two piston-heads. When the piston is in its normal position, as shown in Fig. 3, the water escapes from this space through a series of ports 26 into the tank 10. The upper piston-head 25 is provided with a small port 27 arranged to permit the water to seep slowly through into the upper portion of the chamber 18. The upper end of this chamber is closed by a suitable screw plug 28. 29 is a projection on the inner side of this plug against which the piston-head 25 abuts in its upward movement to limit the travel of the piston.

The lower end of the smaller piston-head 24 is arranged to coöperate with a valve-seat 30, said seat being preferably in the form of a beveled ring of rubber or other proper material. For convenience in manufacture and in renewal of the valve-seat when necessary, said seat is preferably carried upon the upper end of an inner removable sleeve 31 fitting within the lower bore 17 and having a beveled upper end to receive the seat 30. In the present instance, the upper end of the conduit 13 extends into the lower end of the sleeve 31, the parts being secured together by a suitable bushing 32. Stop flanges 33 and 34 may be provided on the sleeve to properly position the parts. The oblique shape and mounting of the valve seat 30 enable it to provide an effective seal for the lower piston-head 24 and also between the sleeve 31 and the lower bore 17. 35 indicates a plurality of discharge ports through which water flows from the tank into the valve and thence to the bowl. These ports are located above the valve seat 30 and therefore above the lower edge of the piston-head 24 when seated, so that said ports are normally closed by said piston-head. The tank-supply ports 26 are in the present instance located just above the lower piston-head, when in normal position, so that ports will be blanked during the first part of the upward movement of the piston. The lower piston-head 24 constitutes a valve-member to control the supply and discharge of water to and from the tank 10, while the upper piston-head constitutes means for operating said valve-member.

A by-passage 36 leads from the upper portion of the enlarged chamber 18 above the upper piston-head 25 and the lower end of said passage has a valve-controlled communication with the interior of the main valve beneath the piston-head 24. In the present instance, the arrangement is as follows: A chamber 37 in the main valve body communicates with the lower end of the by-passage 36, said chamber being closed at its outer end by a stuffing box 38 through which passes the operating stem 39 of a valve 40. This valve controls a port 41 leading from the chamber 37 and communicating with an annular chamber 42 which is formed by an exterior groove in the sleeve 31, said sleeve having a series of ports 43 through which said groove communicates with the interior of the sleeve. A compression spring 44 surrounds the stem of the valve 40 and tends to hold the latter in position to close the port 41. The valve is arranged to be unseated by a suitable hand-operated device, as, for example, a lever 45 pivoted to the tank 10 and to the valve stem 39.

Assuming that the tank has a supply of water and compressed air therein, the operation of the apparatus is as follows: The lever 45 is swung to the left, as viewed in Figs. 1 and 2, so as to unseat the valve 40. Water immediately flows from the upper chamber 18 above the piston-head 25 down through the by-passages 36, 37, 41, 42, and 43 into the interior of the main valve beneath the piston-head 24. This unbalances the pressure acting on the piston, decreasing the pressure at the upper side of the upper piston-head, so that the city water pressure at the under side of said upper piston-head acts to force the entire piston upwardly as far as permitted by the stop 29. In this movement of the piston the discharge ports 35 will be uncovered, so that water will immediately flow from the tank 10 into the lower portion of the valve and thence to the bowl. The piston remains in its elevated position while the water is discharging from the tank under the pressure of the air therein and at the same time the water under city pressure between the two piston-heads is seeping through the small port 27 into the space 18 above the upper piston-head, so that the normal degree of pressure above the piston is gradually being resumed. When all of the water has escaped from the tank, air rushes in through the discharge ports 35 to fill the tank. By this time the pressure of the water above the upper piston-head has risen to a point equal to that between the two heads, so that by reason of the difference in size between the heads, the piston as a whole will be forced downwardly to close the discharge ports 35 and seat the lower piston-head 24 against its valve-seat 30. When in this position, the supply ports 26 are exposed so that water may flow from the space between the two piston-heads through said supply ports to fill up the tank again. During this process of filling, air may be drawn in through the valve device 22. The air which had previously rushed into the tank through the discharge ports 35 will be trapped in the tank and will be gradually compressed as the tank is filled with water under the force of city water pressure. The apparatus will remain in this condition until the next operation thereof.

The structure shown in the drawings represents only one of the various possible embodiments of my invention and the foregoing detailed description is not to be taken as a limitation of the invention in any way. The scope thereof will be pointed out in the appended claims.

I claim as my invention:

1. In a flushing apparatus, the combination with a closed water tank and discharge pipe, of a valve structure comprising a body having an outlet connecting said tank and pipe and also having an inlet for supplying the tank with water, and a valve member in said body movable by water pressure, across said outlet and inlet to alternately open and close the same, whereby the inlet is closed when the outlet is opened, and vice versa.

2. In a flushing apparatus, the combination with a closed water tank and discharge pipe, of a valve structure comprising a body having an outlet port connecting said tank and pipe and also having a combined air and water inlet passage for supplying the tank with air and water, and a pressure actuated valve member in said body movable across said port and passage to alternately open and close the same.

3. A flushing valve comprising a body having two alined bores of different sizes therein, the lower end of the smaller bore having a discharge outlet, the upper end of the large bore being closed, a differential piston having two spaced heads slidable in the respective bores, the body having discharge ports communicating with the smaller bore, said ports being normally closed by the lower piston-head, the body also having tank supply ports normally open to the space between said piston heads and controlled by the lower piston head, the body further having a water supply passage communicating with said space, the larger piston head having a port therethrough to permit the water to pass to the bore above said head, the body further having a by-passage extending from the upper bore above the larger piston-head and communicating at its lower end with the space beneath the lower piston-head, and a manually-operable valve controlling said by-passage and arranged to permit the escape of water from the space above the piston, whereby the pressure of the water will raise the piston to open said discharge ports and close said supply ports.

4. A differential flush valve adapted to be connected to a flush tank and comprising a body having a bore therein, a supply port opening from said bore into said tank, and a discharge port from said tank to said bore, and a water-pressure-operated piston slidable in said bore to open and close the said ports.

5. In a flushing apparatus the combination with a closed tank, of a controlling valve associated with said tank and comprising a body portion having a supply passage connected to a source of water under pressure, a discharge passage, a tank discharge port and a tank supply port, said ports communicating with their respective passages, and a differential valve member in said body portion operable by the water in said supply passage and movable across said ports to alternately open and close one of said ports and simultaneously close and open the other of said ports whereby water is admitted to said tank or discharged therefrom.

In testimony whereof I hereunto set my hand.

JOHN E. OSMER.

In the presence of—
CECILE PROPER,
JAMES N. BRICHAN.

Copies of this patent may be obtained for five cents each, by addressing the "Commissioner of Patents, Washington, D. C."